US006848628B2

(12) United States Patent
Walker

(10) Patent No.: US 6,848,628 B2
(45) Date of Patent: Feb. 1, 2005

(54) MODULAR FOUNTAIN WITH BAYONET CONNECTOR

(75) Inventor: John M. Walker, Grapevine, TX (US)

(73) Assignee: Beckett Corporation, Irving, TX (US)

( * ) Notice: Subject to any disclaimer, the term of this patent is extended or adjusted under 35 U.S.C. 154(b) by 0 days.

(21) Appl. No.: 10/672,523

(22) Filed: Sep. 26, 2003

(65) Prior Publication Data

US 2004/0056480 A1 Mar. 25, 2004

Related U.S. Application Data

(62) Division of application No. 09/864,539, filed on May 23, 2001, now abandoned.
(60) Provisional application No. 60/206,411, filed on May 23, 2000.

(51) Int. Cl.[7] ........................... E03B 9/20; B05B 17/08; B60D 1/62; B61G 5/08; F16B 23/00
(52) U.S. Cl. ............................. 239/16; 239/17; 239/21; 239/22; 239/23; 285/73
(58) Field of Search .............................. 239/16, 17, 21, 239/22, 23, 18, 19, 20; 285/73, 292.1

(56) References Cited

U.S. PATENT DOCUMENTS

| | | | | | |
|---|---|---|---|---|---|
| 489,107 | A | | 1/1893 | Storz | |
| 2,123,892 | A | * | 7/1938 | Grady | 239/23 |
| 2,794,674 | A | | 6/1957 | Przystawik | |
| 2,888,205 | A | * | 5/1959 | Trucco | 239/20 |
| 3,619,084 | A | * | 11/1971 | Gordon | 417/90 |
| 3,691,787 | A | * | 9/1972 | Kaufmann | 62/400 |
| 3,713,583 | A | * | 1/1973 | Gruber | 239/17 |
| 4,602,654 | A | | 7/1986 | Stehling et al. | |
| 5,301,985 | A | | 4/1994 | Terzini | |
| 6,029,899 | A | | 2/2000 | Walker | |

* cited by examiner

*Primary Examiner*—Michael Mar
*Assistant Examiner*—Darren Gorman
(74) *Attorney, Agent, or Firm*—Gandere Wynne Sewell LLP

(57) ABSTRACT

A modular fountain includes a base, a bowl and a top or statue supported on the bowl by a pump housing in the bowl. Twist and lock bayonet type connectors are provided for connecting the base to the bowl and the top, if used, to the bowl at the pumping housing. A through passage between the pump housing, the bowl and the base is formed for training a pump power cord therethrough, for example.

11 Claims, 3 Drawing Sheets

MODULAR FOUNTAIN WITH BAYONET CONNECTOR

CROSS REFERENCE TO RELATED APPLICATIONS

This application is a division of application Ser. No. 09/864,539, filed: May 23, 2001 now abandoned which claims priority of application Ser. No. 60/206,411 filed on May 23, 2000.

BACKGROUND OF THE INVENTION

Decorative placements, for example, fountains, statuary, monuments, and bird baths, are fabricated in multiple sections to allow for easier packaging and shipment. Various ways have been provided to connect the sections together so as to assemble a placement. Sections of traditional fountains, whether made of a natural or man-made material, are typically fastened together using threaded fasteners, such as bolts and nuts or threaded inserts. Sections of statuary or bird baths are often interconnected by having mating sections with a socket formed in one and having a pin or dowel protruding from the other. Sections of monuments often are interconnected using the dowel/socket mechanism, as described above, or by grouting the sections together.

Each of these prior connection mechanisms and methods require the assembler to have tools and assembly knowledge in order to assemble the placement. Thus, a mechanism is needed which allows the easy assembly of a placement from multiple sections without the need for tools.

BRIEF SUMMARY OF THE INVENTION

The present invention provides a new and advantageous connector that allows interconnecting sections of a fountain to be assembled using few, if any, hand tools. The present invention also provides an interconnection structure for sections of a fountain that allow the sections to be readily engageable and disengageable from one another.

More specifically, the present invention provides a modular connector including a collar having a first collar portion, a second collar portion, a third collar portion, two ears, two flanges and at least two mounting tabs. The first collar portion has a first outside diameter and a first inside diameter. The second collar portion is disposed between the first collar portion and the third collar portion and has the first outside diameter and a second inside diameter, the second inside diameter being smaller than the first inside diameter. The third collar portion has a second outside diameter and the second inside diameter, the second outside diameter being smaller than the first outside diameter. The two ears oppose one another, each ear extending from the second collar portion through the first collar portion and above the first collar portion, each ear disposed between the first inside diameter and the second inside diameter. The two flanges oppose one another, each flange extends inwardly from the first collar portion to form a channel with the second collar portion. The at least two mounting tabs extend outwardly from the third collar portion and are approximately equally spaced from one another.

The present invention also provides a modular connector system including a first collar and a second collar. Each collar has a first collar portion, a second collar portion, a third collar portion, two ears, two flanges and at least two mounting tabs. The first collar portion has a first outside diameter and a first inside diameter. The second collar portion is disposed between the first collar portion and the third collar portion and has the first outside diameter and a second inside diameter, the second inside diameter being smaller than the first inside diameter. The third collar portion has a second outside diameter and the second inside diameter, the second outside diameter being smaller than the first outside diameter. The two ears oppose one another, each ear extending from the second collar portion through the first collar portion and above the first collar portion, each ear disposed between the first inside diameter and the second inside diameter. The two flanges oppose one another, each flange extends inwardly from the first collar portion to form a channel with the second collar portion. The at least two mounting tabs extend outwardly from the third collar portion and are approximately equally spaced from one another. The first collar is engageable with the second collar by engaging the ears of the first collar with the flanges of the second collar and the ears of the second collar with the flanges of the first collar.

In addition, the present invention provides a modular fountain having a top portion collar, a base and a bayonet connector. The top portion collar has a cavity therein and a lower surface, the lower surface has an opening extending therethrough for access to the cavity. The base supports the top portion and has a cavity therein, an upper surface and a lower surface, the upper surface having an opening extending therethrough, the lower surface for resting on a support surface. The bayonet connector is for removably connecting the top portion and the base. The bayonet connector includes a first collar and a second collar. The first collar of the bayonet connector is rigidly disposed in the opening extending through the lower surface of the top portion. The second collar of the bayonet connector is rigidly disposed in the opening extending through the upper surface of the base. The first collar of the bayonet connector is engageable with the second collar of the bayonet connector. The bayonet connector has a passage therethrough so that, when the first collar of the bayonet connector is engaged with the second collar of the bayonet connector, a passageway exists between the cavity of the top portion and the cavity of the base.

Moreover, the present invention provides a modular fountain having a pump, a statue, a bowl, a pump housing, a first bayonet connector, a base, a second bayonet connector and a tube. The pump circulates water in the modular fountain and has a power cord for supplying electrical power to the pump. The statue has a cavity therein and a lower surface, the lower surface has an opening extending therethrough for access to the cavity. The bowl has an upper curved surface defining a concave portion for storing water and a lower surface, the bowl has an opening extending through the lower surface and the upper curved surface. The pump housing supports the statue and contains the pump. The pump housing has a wall with an inner surface, the wall connected to and extending from the upper curved surface of the bowl and a top having an inner surface. The upper curved surface of the bowl, the inner surface of the wall and the inner surface of the top define an internal portion of the pump housing. The top has an opening extending therethrough for access to the internal portion of the pump housing. The pump housing is disposed on the upper curved surface of the bowl so that the opening in the bowl allows access to the internal portion of the pump housing. The first bayonet connector is for removably connecting the statue and the pump housing. The first bayonet connector includes a first collar rigidly disposed in the opening extending through the lower surface of the statue and a second rigidly disposed in the opening extending through the top of the pump housing. The first collar of the first bayonet connector is engageable with the second collar of the first bayonet connector. The first bayonet connector has a passage therethrough so that, when the first collar of the first bayonet connector is engaged with the second collar of the first bayonet connector, a passageway exists between the cavity of the statue and the internal portion of the pump housing. The base supports the bowl and has a cavity therein, an upper surface and a lower surface. The upper surface has an opening extending therethrough and the lower surface rests on a support surface. The second bayonet connector is for removably connecting the bowl and the base. The second bayonet connector includes a first collar rigidly disposed in the opening in the bowl and a second collar rigidly disposed in the opening extending through the upper surface of the base. The first collar of the second bayonet connector is engageable with the second collar of the second bayonet connector. The second bayonet connector has a passage therethrough so that, when the first collar of the second bayonet connector is engaged with the second collar of the second bayonet connector, a passageway exists between the internal portion of the pump housing and the cavity of the base. The tube extends through the opening in the bowl, wherein, when the statue is connected to the pump housing via the first bayonet connector and the bowl is connected to the base via the second bayonet connector, the tube extends between the cavity of the statue and the cavity of the base and the tube is capable of providing a passageway for the power cord of the pump from the pump housing into the cavity of the base.

BRIEF DESCRIPTION OF THE DRAWINGS

Other advantages and features of the invention will become more apparent with reference to the following detailed description of the invention in connection with the accompanying drawings, in which.

DETAILED DESCRIPTION OF THE INVENTION

While the making and using of various embodiments of the present invention are discussed herein in terms of modular or bayonet-type connectors for fountains, it should be appreciated that the present invention provides many applicable inventive concepts that can be embodied in a wide variety of specific contexts. The specific embodiments discussed herein are merely illustrative of specific ways to make and use the invention and are not meant to limit its scope in any way.

The present invention provides a new and advantageous connector that allows interconnecting sections of a fountain to be assembled using few, if any, hand tools. The present invention also provides an interconnection structure for sections of a fountain that allow the sections to be readily engageable and disengageable from one another.

Figure 1:
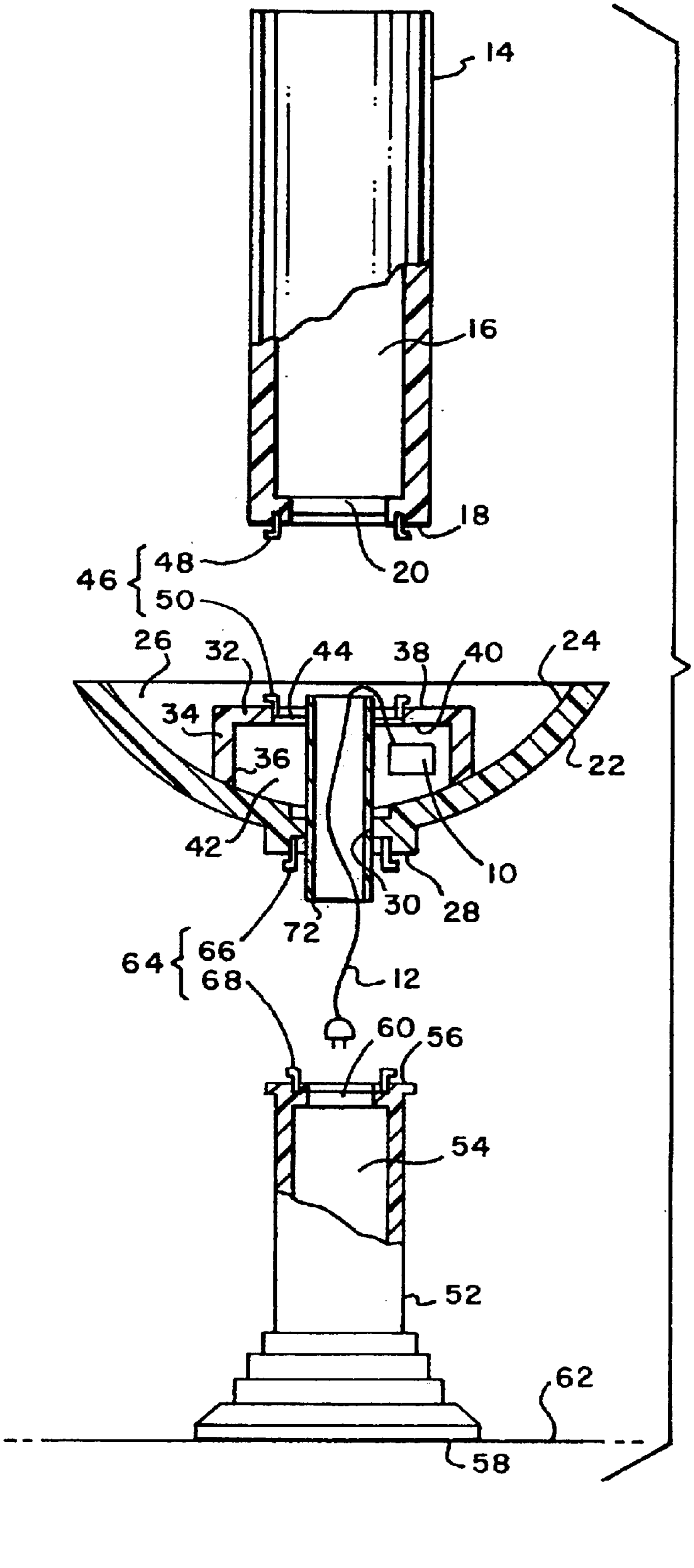
FIG. 1 is an exploded partial cross-sectional side view of a fountain of the present invention.

FIG. 1 illustrates an exploded partial cross-sectional side view of a fountain of the present invention. A pump 10 is provided having a power cord 12 for supplying electrical power to the pump 10. The fountain has a statue 14, which has a cavity 16 therein and a lower surface 18. The statue 14 has an opening 20 extending through the lower surface 18 into the cavity 16.

The fountain of the present invention also has a bowl 22 with a curved upper surface 24 defining a concave portion 26 for storing water and a lower surface 28, the bowl further having an opening 30 extending through the lower surface and the curved upper surface 24. A pump housing 32, for supporting the statue 14 and for containing the pump 10, has a wall 34 with an inner surface 36. The wall is connected to and extends from the curved upper surface 24 of the bowl 22. The pump housing 32 further has a top 38 with an inner surface 40. The inner surface 40 of the top 38, the inner surface 36 of the wall 34, and the curved upper surface 24 of the bowl 22 define an interior portion 42 of the pump housing 32. The top 38 of the pump housing 32 has an opening 44 extending therethrough for access to the interior portion 42 of the pump housing 32. The pump housing 32 is disposed on the curved upper surface 24 of the bowl 22 so that the opening 30 in the bowl 22 allows access to the interior portion 42 of the pump housing 32.

A first bayonet connector 46, made up of a first collar 48 and a second collar 50, is used to removably connect the statue 14 and the pump housing 32. The first collar 48 of the first bayonet connector 46 is rigidly disposed in the opening 20 extending through the lower surface 18 of the statue 14. The second collar 50 of the first bayonet connector 46 is rigidly disposed in the opening 44 extending through the top 38 of the pump housing 32. The first collar 48 of the first bayonet connector 46 is engageable with the second collar 50 of the first bayonet connector 46. The first bayonet connector 46 has a passage therethrough so that, when the first collar 48 of the first bayonet connector 46 is engaged with the second collar 50 of the first bayonet connector 46, a passageway 51, see FIGS. 3 and 4, exists between the cavity 16 of the statue 14 and the interior portion 42 of the pump housing 32.

The fountain has a base 52 for supporting the bowl 22 and which has a cavity 54 within. The base 52 further has an upper surface 56 and a lower surface 58. The upper surface 56 has an opening 60 extending therethrough. The lower surface 58 is for resting on a support surface 62. A second bayonet connector 64 is made up of a first collar 66, which is rigidly disposed in the opening 30 in the bowl 22, and a second collar 68, which is rigidly disposed in the opening 60 extending through the upper surface 56 of the base 52. The first collar 66 of the second bayonet connector 64 is engageable with the second collar 68 of the second bayonet connector 64 to fix the bowl 22 to the base 52. When the first collar 66 of the second bayonet connector 64 is engaged with the second collar 68 of the second bayonet connector 64, a passageway 70, see FIGS. 3 and 4, exists between the interior portion 42 of the pump housing 32 and the cavity 54 in the base 52.

Figure 2:
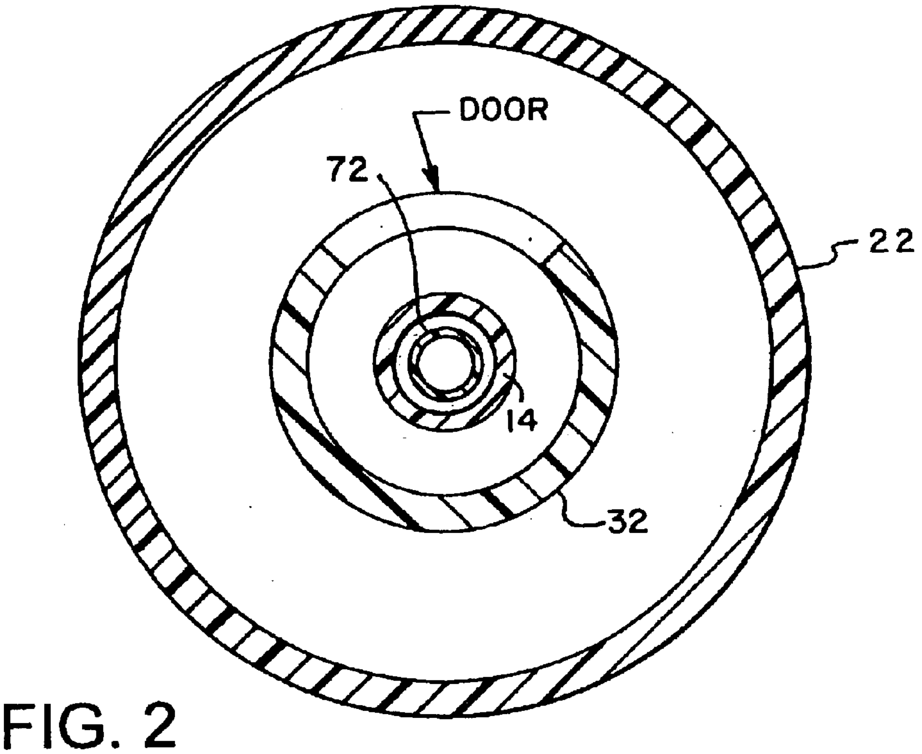
FIG. 2 is a partial transverse cross-sectional view of a fountain of the present invention.

FIG. 2 illustrates a partial cross-sectional side view of a fountain of the present invention. Now referring to FIGS. 1 and 2, when the fountain is assembled, a tube 72 extends through the passageway between the pump housing 32 and the base 52, so that when the statue 14 is connected to the pump housing 32 via the first bayonet connector 46 and the bowl 22 is connected to the base 52 via the second bayonet connector 64, the tube 72 extends between the cavity 16 of the statue 14 and cavity 54 of the base 52. The tube 72 is capable of providing a passageway for the electrical cord 12 of the pump 10, as well as other elements, from the pump housing 22 into the cavity 54 of the base 52.

Figure 3:
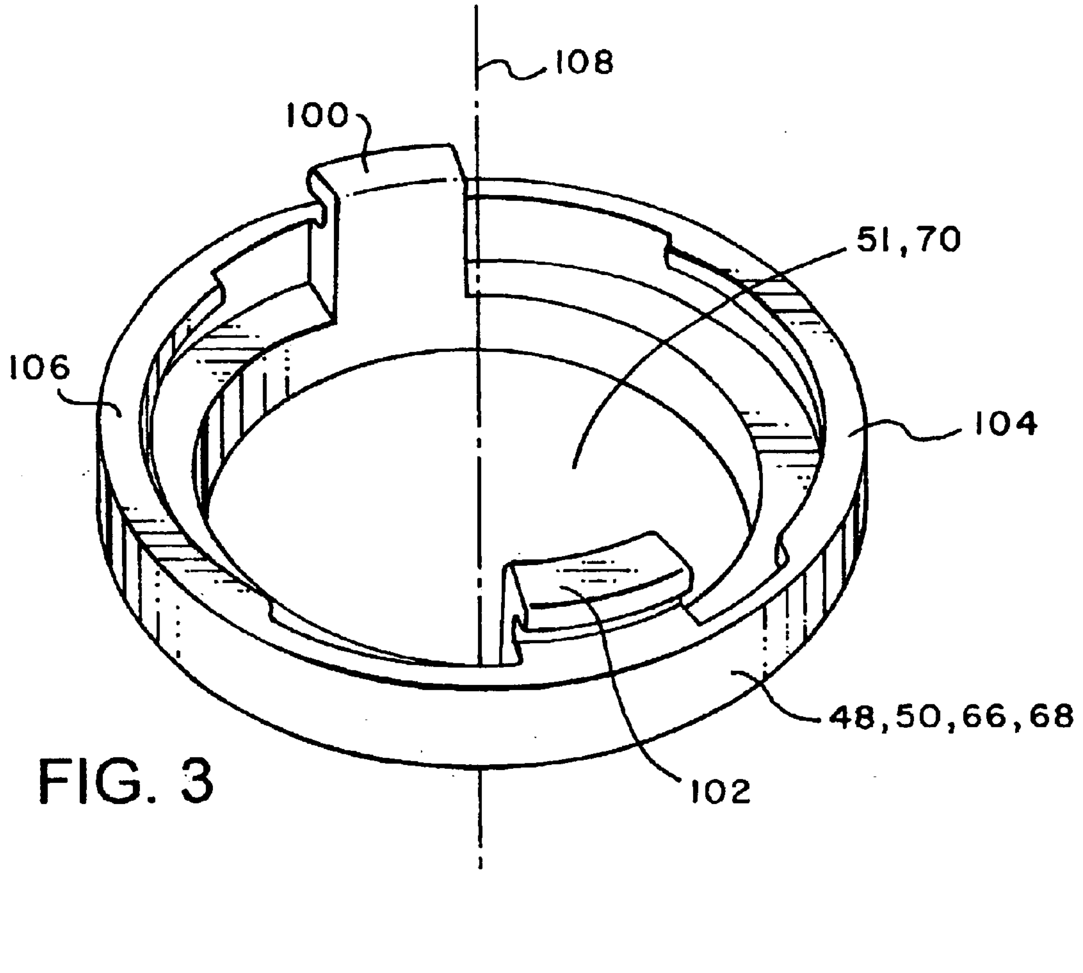
FIG. 3 is a pictorial view of a modular or bayonet-type connector of the present invention.
Figure 4:
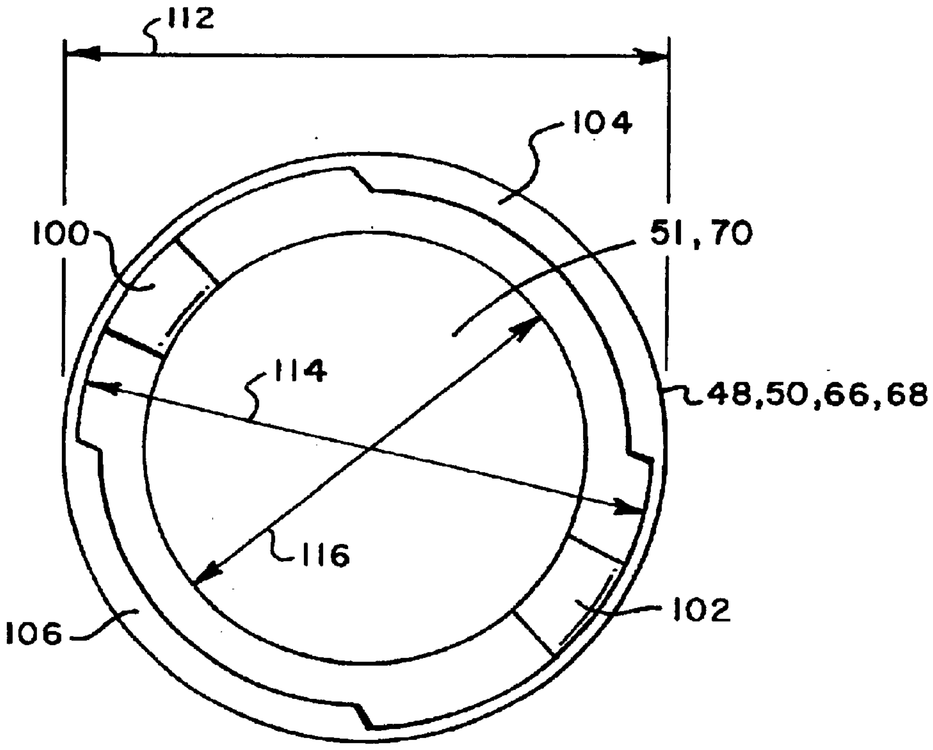
FIG. 4 is a top view of a modular or bayonet-type connector of the present invention.
Figure 5:
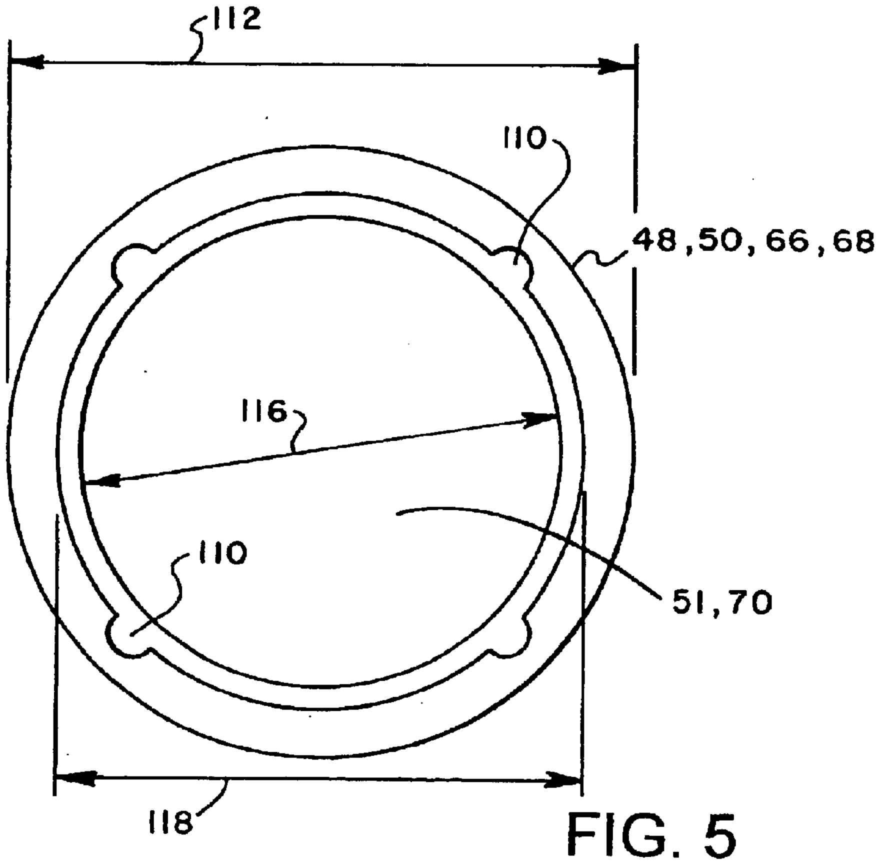
FIG. 5 is a bottom view of a modular or bayonet-type connector of the present invention.

Referring now to FIGS. 3, 4 and 5, which illustrate various views a modular or bayonet-type connector of the present invention, the modular or bayonet-type connector includes a collar 48, 50, 66 and 68 having a first collar portion (the top portion of 48, 50, 66 and 68 shown in FIGS. 3 and 4), a second collar portion (the middle portion of 48, 50, 66 and 68 shown in FIGS. 3, 4 and 5), a third collar portion (the bottom portion of 48, 50, 66 and 68 shown in FIG. 5), two ears 100 and 102, two flanges 104 and 106 and at least two mounting tabs 110. The first collar portion has a first outside diameter 112 and a first inside diameter 114. The second collar portion is disposed between the first collar portion and the third collar portion and has the first outside diameter 112 and a second inside diameter 116, the second inside diameter 116 being smaller than the first inside diameter 114. The third collar portion has a second outside diameter 118, FIG. 5, and the second inside diameter 116, the second outside diameter 118 being smaller than the first outside diameter 112. The two ears 100 and 102 oppose one another, each ear 100 and 102 extending from the second collar portion through the first collar portion and above the first collar portion, each ear 100 and 102 disposed between the first inside diameter 114 and the second inside diameter 116. The two flanges 104 and 106 oppose one another, each flange 104 and 106 extends inwardly from the first collar portion to form a channel with the second collar portion. The at least two mounting tabs 110 extend outwardly from the third collar portion and are approximately equally spaced from one another.

The present invention also provides a modular connector system including a first collar and a second collar. Each collar is the same as described in the previous paragraph. The first collar is engageable with the second collar by engaging the ears 100 and 102 of the first collar with the flanges 104 and 106 of the second collar and the ears 100 and 102 of the second collar with the flanges 104 and 106 of the first collar.

In one embodiment of the present invention, each of the bayonet s collars 48, 50, 66, and 68 are equivalent; that is, they have identical structures. Thus, the following description of the first collar 48 and the second collar 50 of the first bayonet connector 46 applies equally to the first collar 66 and the second collar 68 of the second bayonet connector 64. In this embodiment, each of the first collar 48 and second collar 50 s of the first bayonet connector 46 has a first ear 100 and a second ear 102. Each of the collars 48 and 50 also has a first flange 104 and a second flange 106. When the first collar 48 is mated to the second collar 50 and the first collar 48 is rotated with respect to the second collar 50 about a common, central axis 108, the first ear 100 of the first collar 48 engages with the first flange 104 of the second collar 50, and the second ear 102 of the first collar 48 engages with the second flange 106 of the second collar 50. Further, the first ear 100 of the second collar 50 engages with the first flange 104 of the first collar 48, and the second ear 102 engages with the second flange 106 of the first collar 48. In his way, the two s collars 48 and 50 engage each other and become fixed with respect to each other.

Also, as can be seen, the first ear 100 of the first collar 48 can engage with the second flange 106 of the second collar 50, and so forth, as, in this embodiment, either ear of one collar of a connector is capable of being engaged with either flange of the other collar of the connector.

Accordingly, the present invention is a placement, for example, a fountain, having a modular, bayonet-type connector which is used to interconnect sections of the placement. In the case of a fountain, the invention has a pump for circulating water in the fountain and two or more sections that are, in a preferred embodiment, interconnected with a bayonet-type connector.

Now referring back to FIG. 1, to assemble the sections of such a fountain, an area (support surface 62) is located which is flat and suitable for the fountain. The base column 52 of the fountain is placed in the selected area (support surface 62), the bowl 22 of the fountain is placed onto the base 52 such that the two collars 66 and 68 of the bayonet-type connector 64 (one in the base 52 and one in the bowl 22) are mated. The bowl 22 is rotated with respect to the base 52 of the fountain to interconnect the bowl 22 and the base 52. The pump 10 is placed in the pump housing 32 which is disposed in the fountain bowl 22 and the power cord 12 for the pump 10 is routed through the tube 72 which, when the fountain is assembled, provides a passageway from the statue 14 into the base 52. The statue 14 is then placed onto the pump housing 32 so that the collars 48 and 50 of the bayonet-type connector 46 (one in the pump housing 32 and one in the statue 14) are mated. The statue 14 is rotated with respect to the pump housing 32 (and therefore the bowl 22) to interconnect the statue 14 and the pump housing/bowl (32 and 22). Tubing is attached to the pump discharge port as required for the fountain, water is added to the bowl, and electricity is supplied to the pump.

An embodiment having different types of bayonet connectors, or having one bayonet connector and another quick-connect connector of another type, is within the scope of the present invention.

The scope of the present invention also encompasses a fountain wherein no statue is present, thus having all the features shown in FIG. 1 except the statue 14 and the first bayonet connector 46. In this embodiment, it is possible for the pump housing 22 to have a solid top with no opening 44 in the top 38, as shown in FIG. 1. Further, it is within the scope of the present invention for either the base 52 and bowl 22, or the statue 14, pump housing 32, and bowl 22 to be made as a one piece structure, so that one of either the first bayonet connector 46 or the second bayonet connector 64 is not needed.

The scope of the present invention also includes a placement other than a fountain, in which portions of the placement are interconnected via one or more bayonet connectors. In addition, connectors other than bayonet-type connectors, which are quick-type connectors needing few or no tools to engage and which are used to interconnect portions of a placement, are within the scope of the present invention.

Although the present invention has been described with reference to a presently preferred embodiment, it will be appreciated by those skilled in the art that various modifications, alternatives, variations, etc., may be made without departing from the spirit and scope of the invention as defined in the appended claim.

What is claimed is:

1. A modular fountain, comprising:

a pump for circulating water in said fountain, said pump having a power cord for supplying electrical power to said pump;

a statue having a lower surface, including an opening extending therein;

a bowl having an upper curved surface defining a concave portion for storing water and a lower surface, said bowl having an opening extending through both said lower surface and said upper curved surface of said bowl;

a pump housing for supporting said statue and for containing said pump, said pump housing extending from said upper curved surface of said bowl and including a top wall having an opening extending therethrough for access to an internal portion of said pump housing, said pump housing being disposed on said upper curved surface of said bowl so that said opening in said bowl allows access to said internal portion of said pump housing;

a first bayonet connector for removably connecting said statue to said pump housing, and comprising a first collar rigidly disposed in said opening in said lower surface of said statue and a second collar rigidly disposed in said opening extending through said top wall of said pump housing, said first collar of said first bayonet connector being engageable with said second collar of said first bayonet connector, said first bayonet connector having a passage therethrough so that, when said first collar of said first bayonet connector is engaged with said second collar of said first bayonet connector, a passageway exists between said cavity of said statue and said internal portion of said pump housing;

a base for supporting said bowl, said base having a cavity therein, an upper surface and a lower surface, said upper surface of said base having an opening extending therethrough, said lower surface of said base for resting on a support surface;

a second bayonet connector for removably connecting said bowl to said base, said second bayonet connector comprising a first collar rigidly disposed in said opening in said bowl and a second collar rigidly disposed in said opening extending through said upper surface of said base, said second bayonet connector having a passage therethrough so that, when said first collar of said second bayonet connector is engaged with said second collar of said second bayonet connector, a passageway exists between said internal portion of said pump housing and said cavity of said base; and a conduit extending through said opening in said bowl, wherein, when said bowl is connected to said base by said second bayonet connector, said conduit is operable to provide a passage for said power cord of said pump from said pump housing into said cavity of said base.

2. A modular fountain comprising:

a base member including a lower surface for supporting said base member and an upper surface, said upper surface including an opening formed therein and in communication with a passage in said base member;

a top portion of said fountain including a bowl for containing a quantity of water, said top portion including a lower surface for engagement with said upper surface of said base member, said lower surface of said top portion including an opening formed therein, and;

a twist and lock, bayonet connector for removably connecting said top portion to said base member, said bayonet connector including a first collar connected to said top portion and disposed in said opening in said lower surface of said top portion and a second collar connected to said base member and disposed in said opening in said upper surface of said base member, said bayonet connector including cooperating projections for engaging said first collar with said second collar in a twist and lock manner for connecting said top portion to said base member and when said top portion is connected to said base member a passageway is provided between said bowl and said passage in said base member.

3. The modular fountain set forth in claim 2 including:

a conduit extending through said opening in said bowl and said opening in said base member.

4. The modular fountain set forth in claim 3 including:

a pump disposed in said bowl and a power cord extending between said pump and said base member through said conduit and into said passage in said base member.

5. The modular fountain set forth in claim 4 including:

a housing disposed in said bowl and enclosing said pump.

6. The modular fountain set forth in claim 5 wherein:

said housing includes a top wall having an opening therein for access to an interior portion of said housing.

7. The modular fountain set forth in claim 5 including:

an additional twist and lock bayonet connector including a first collar connected to a further part of said fountain and a second collar supported on said housing and whereby said further part of said fountain may be releasably connected to said top portion by engagement of said first and second collars of said additional bayonet connector for releasably connecting said further part of said fountain to said top portion.

8. The modular fountain set forth in claim 6 wherein:

said conduit extends within said opening in said top wall of said housing.

9. A modular fountain, comprising:

a pump for circulating water in said fountain, said pump having a power cord for supplying electrical power to said pump;

a bowl for storing water and including a lower surface, said bowl having an opening extending through said lower surface;

a pump housing for containing said pump, said pump housing being supported in said bowl and including a top wall having an opening extending therethrough for access to an internal portion of said pump housing, said pump housing being disposed in said bowl so that said opening in said bowl allows access to said internal portion of said pump housing;

a base for supporting said bowl, said base having a cavity therein, an upper surface and a lower surface, said upper surface of said base having an opening extending therethrough, said lower surface of said base for resting said fountain on a support surface; and one bayonet connector for removably connecting said bowl to said base, said one bayonet connector comprising a first collar rigidly disposed in said opening in said bowl and a second collar rigidly disposed in said opening extending through said upper surface of said base, said one bayonet connector having a passage therethrough so that, when said first collar of said one bayonet connector is engaged with said second collar of said one bayonet connector, a passageway exists between said internal portion of said pump housing and said cavity in said base.

10. The modular fountain set forth in claim 9 including:

a statue having a lower surface; and an additional bayonet connector for removably connecting said statue to said pump housing and comprising a first collar connected to said statue and a second collar rigidly disposed in said opening extending through said top wall of said pump housing, said first collar of said additional bayonet connector being engageable with said second collar of said additional bayonet connector, said additional bayonet connector having a passage therethrough so that, when said first collar of said additional bayonet connector is engaged with said second collar of said additional bayonet connector, a passageway exists between a cavity in said statue and said internal portion of said pump housing.

11. The modular fountain set forth in claim 10 including:

a conduit extending through said opening in said bowl wherein, when said bowl is connected to said base by said one bayonet connector, said conduit is operable to provide a passage for said power cord of said pump from said pump housing into said cavity in said base.

* * * * *